(12) United States Patent
Fok

(10) Patent No.: US 8,436,952 B2
(45) Date of Patent: May 7, 2013

(54) HYBRID ILLUMINATION SYSTEM FOR HEAD-UP DISPLAY

(75) Inventor: Lo Ming Fok, Kennedy Town (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 320 days.

(21) Appl. No.: 12/790,787

(22) Filed: May 28, 2010

(65) Prior Publication Data

US 2011/0292346 A1 Dec. 1, 2011

(51) Int. Cl.
*G02F 1/1335* (2006.01)
*G03H 1/00* (2006.01)
*G02B 27/14* (2006.01)
*G03B 21/00* (2006.01)

(52) U.S. Cl.
USPC ............... 349/11; 349/68; 359/13; 359/630; 353/13

(58) Field of Classification Search .............. 349/11, 349/68; 353/13, 14; 359/13, 14, 630–633
See application file for complete search history.

(56) References Cited

U.S. PATENT DOCUMENTS

| | | | | |
|---|---|---|---|---|
| 4,997,263 A * | 3/1991 | Cohen et al. | ..................... | 349/11 |
| 5,748,237 A * | 5/1998 | Ueda et al. | ............... | 348/333.08 |
| 7,059,731 B2 * | 6/2006 | Lee et al. | ........................ | 353/99 |
| 7,391,574 B2 | 6/2008 | Fredriksson | | |
| 7,430,349 B2 | 9/2008 | Jones | | |
| 2009/0034087 A1 * | 2/2009 | Hung et al. | ................... | 359/630 |

FOREIGN PATENT DOCUMENTS

WO WO95/13557 5/1995

* cited by examiner

*Primary Examiner* — Thanh Luu
*Assistant Examiner* — Renee Naphas
(74) *Attorney, Agent, or Firm* — Ella Cheong Hong Kong; Sam T. Yip

(57) ABSTRACT

A head-up display including a hybrid illumination system is provided. A light mixing unit provides a substantially homogenous light source to a reflective display unit. A concentrating optics unit collects ambient light and directs it towards the light mixing unit. At the same time, an electrically-powered light source emits light which is directed towards the light mixing unit. One or more optical elements direct the ambient light and the light source light into the light mixing unit for homogenization. A condensing unit receives the homogenized light mixture and outputs the condensed light to a polarizing beam splitter. A reflective display modulates the light from the polarizing beam splitter with information from a source of electrical information signals back towards the polarizing beam splitter. A projection unit projects the modulated light to create an image on a windshield.

20 Claims, 6 Drawing Sheets

HYBRID ILLUMINATION SYSTEM FOR HEAD-UP DISPLAY

FIELD OF INVENTION

The present invention relates to head-up displays in general and, more particularly, to illumination systems for head-up displays.

BACKGROUND

Head-up displays (HUD) are systems which project images onto a viewing surface at a position which allows the viewer to maintain a posture in which the gaze is directed forward rather than downward to a display or instrument panel. Head-up displays are used in various environments such as motor vehicles, aircraft, helmets and other situations in which it is important that the viewer not divert his gaze.

Although head-up displays are useful in such environments, the images can sometimes be difficult to discern in bright ambient lighting conditions. Therefore, there is a need in the art for displays which can be easily viewed in bright light. Previously, attempts have been made to harvest ambient light for head-up displays. An example of such a head-up display is found in WO 95/13557 which uses an ambient light source in a display which projects images onto a windshield. Attempts have also been made to combine ambient light with another light source as in U.S. Pat. No. 4,997,263 and U.S. Pat. No. 7,430,349. Although ambient light and another light source are used, the former patent has low ambient light collection efficiency, while the latter involves complex collection fiber optics. Further, neither patent combines the two light sources in such a manner as to provide a uniform light source for the display.

Thus there is a need in the art for improved light sources for head-up displays which can provide both adequate brightness of the display and a uniform light source for the display in order to permit clear viewing under high ambient light conditions.

SUMMARY OF THE INVENTION

The present invention is a head-up display (HUD) unit that utilizes both ambient light from the environment and the visible light from an electrical light source for illumination of the projected image. It comprises a concentrating optics unit, a first beam-shaping optics unit, a second beam-shaping optics unit, a light-mixing unit, a condensing unit, a polarizing beamsplitter (PBS), a reflective display unit, a projection unit, a diffusing film and a light source. Reflective mirrors are optionally used to change the optical paths of the light depending on the locations of the various components. Moreover, it may further comprise a brightness enhancer and a pre-polarizer.

The concentrating optics unit collects ambient light from the environment and redirects it towards the axis of the concentrating optics unit so that it falls within a defined cone angle. In a first embodiment of the invention, wherein the axes of the concentrating optics unit and the first beam-shaping optics are parallel and coincident, the light emerging from the concentrating optics unit is fed directly into the first beam-shaping optics unit. In a second embodiment of the invention, wherein the axes of the concentrating optics unit and the first beam-shaping optics are not parallel, the light emerging from the concentrating optics unit is fed into the beam-shaping optics unit via a reflective element. The function of the first beam-shaping optics unit is to collimate the concentrated ambient light, and direct it towards the light-mixing unit via a reflective mirror.

The visible light from the light source is passed through the beam-shaping optics unit for collimation. The collimated light from the beam-shaping optics is subsequently directed towards the light-mixing unit via a reflective mirror.

The light-mixing unit combines and homogenizes all the light within the light-mixing unit and it controls the spreading angle of the mixed light that will be projected onto the reflective display unit so that the reflective display unit receives a uniform illumination. The mixed light coming out of the light-mixing unit is then fed into the condensing unit, which then directs the light towards the PBS.

If a pre-polarizer is present, it is preferably installed between the condensing unit and the PBS. The pre-polarizer is oriented such that only light in the block polarization state of the PBS is transmitted. Therefore, the transmitted light from the pre-polarizer will be reflected at the PBS towards the reflective display unit. At the PBS, light having one specific polarization is completely reflected while light having the orthogonal polarization is transmitted. The light that is reflected off the PBS then reaches the reflective display unit. The reflective display unit, which has a video signal as its input during operative use, spatially modulates the incident light by polarization rotation. The reflected light contains light in both the block and the pass polarizations for the PBS. Only the light in the pass polarization of the PBS, i.e. the image light, is transmitted through the PBS towards the projection unit. Subsequently, the projection unit projects an image from the video signal onto a diffusing film, which then forms a real image that is reflected onto the windshield into the observer's view of sight.

DETAILED DESCRIPTION

Figure 1:
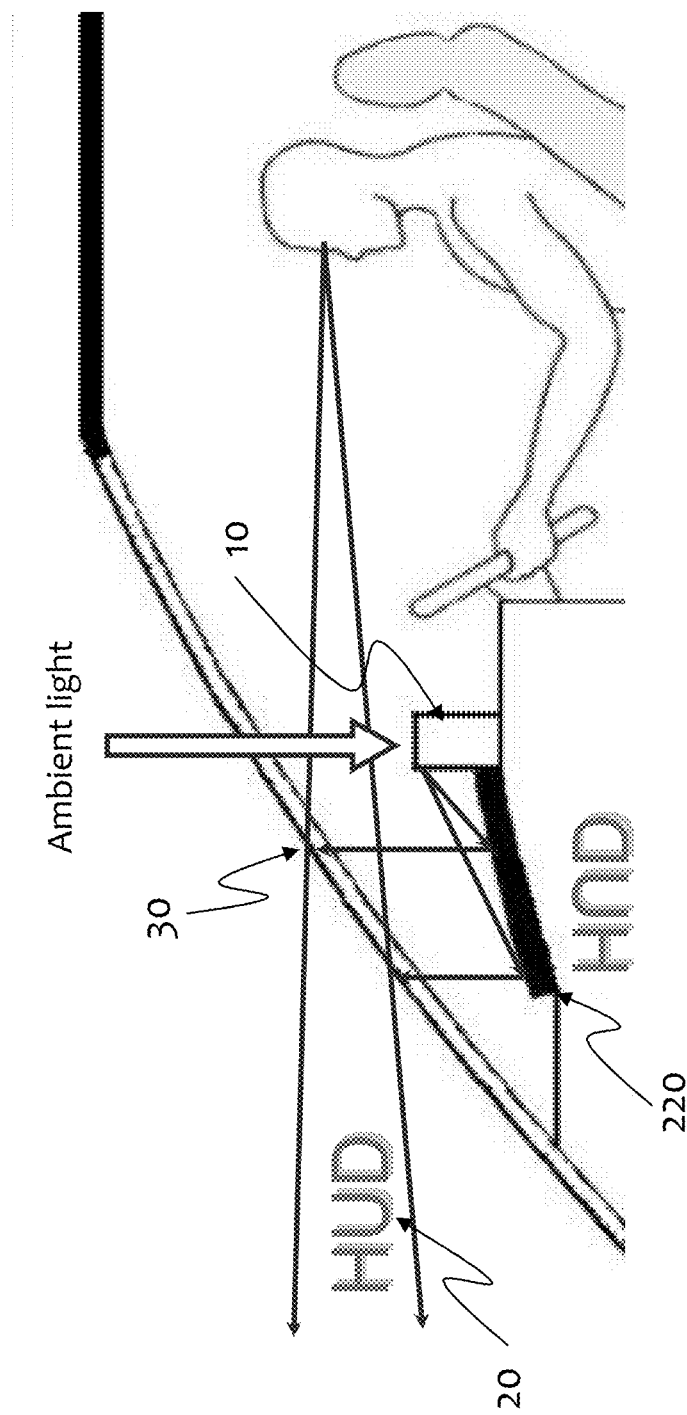
FIG. 1 schematically depicts a head-up display incorporating ambient light according to an embodiment of the present invention.

Turning to the drawings in which like numerals indicate the same or similar features in each of the several views, FIG. 1 schematically depicts a head-up display 10 according to an embodiment of the present invention. As seen in FIG. 1, the present invention collects ambient light to be used to enhance the illumination optics used in the head-up display. This ambient light, combined with visible light from an electrically-powered light source, such as a light-emitting diode (LED) or a laser diode, is used to form an image with an enhanced level of brightness.

When the present invention is being used with a vehicle as depicted in FIG. 1, an image 20 which is formed by the head-up display (HUD) unit 10 will be projected onto a diffusing film 220 and reflected to the windshield 30, which can then be seen by the driver. Optionally, the HUD unit may be positioned on top of the dashboard, as this minimizes the obstruction to the driver's view ahead. Nonetheless, the HUD unit can also be placed in other appropriate locations within the vehicle such as partially or fully in the dashboard, the vehicle roof, etc.

Figure 2:
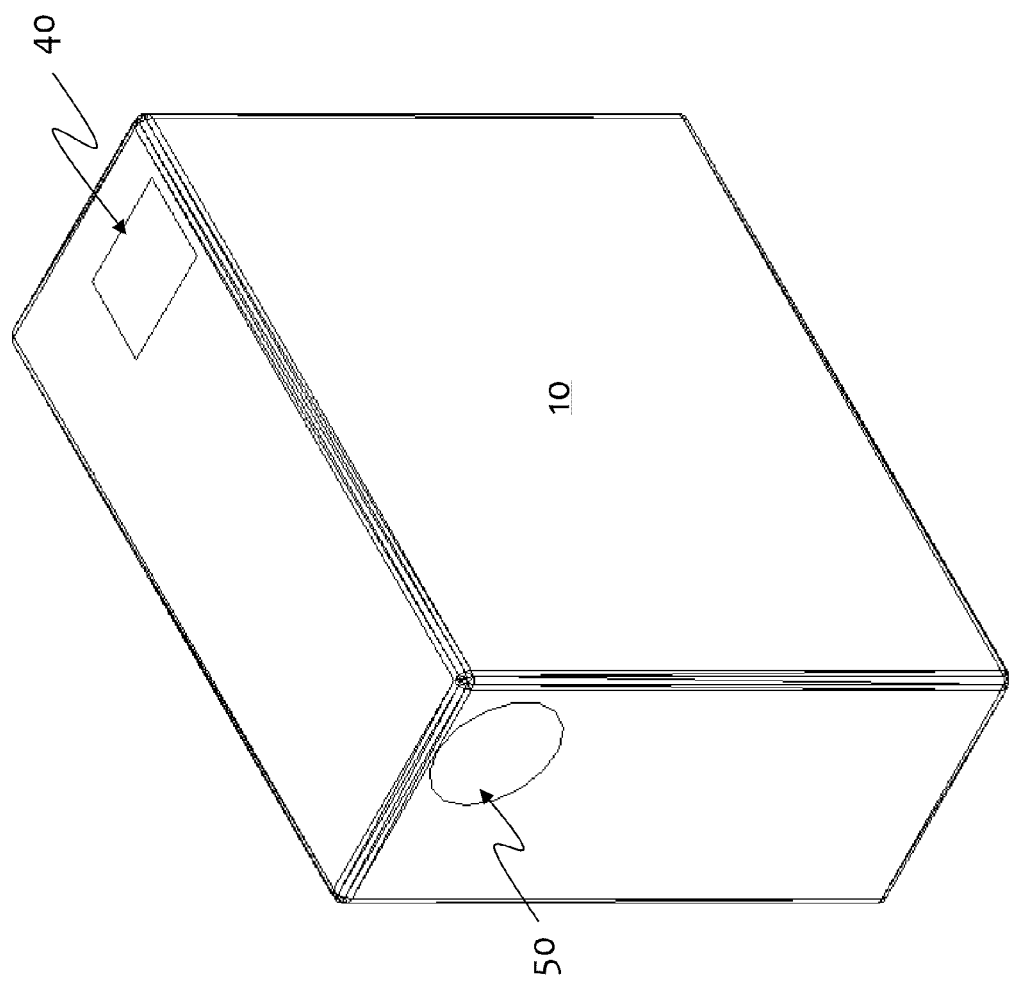
FIG. 2 is an external view of a head-up display incorporating ambient light according to one embodiment of the present invention.

A schematic view of the exterior of HUD unit 10 is depicted in FIG. 2. Ambient light enters unit 10 through window 40 and the exit for the projection optics is shown at projection port 50. Due to the compact design of HUD unit 10, after-market installation in automobiles is easily accomplished. In this manner, HUD 10 may form part of a navigation/GPS system that may be conveniently installed in any motor vehicle.

Figure 3:
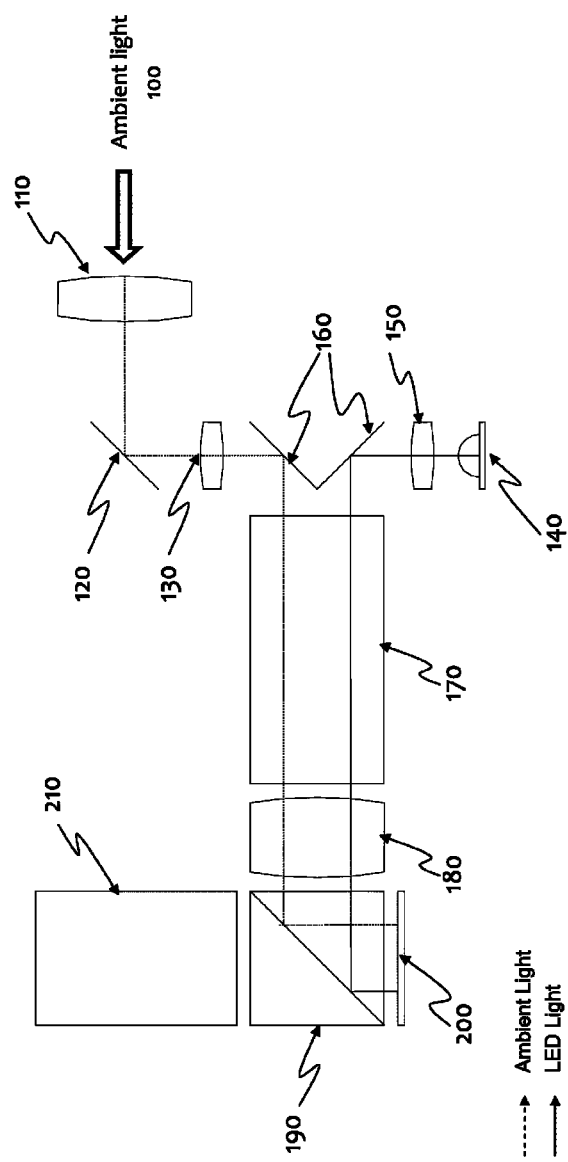
FIG. 3 is a schematic depiction of the optics used in an embodiment of the head-up display of the present invention.

An overview of the optics used in an embodiment of the present invention is depicted schematically in FIG. 3. As seen in FIG. 3, ambient light and light from a light source such as one or more LEDs/lasers are combined to form a single, substantially uniform light source for use in the HUD. Ambient light 100 enters concentrating optics unit 110, where it is optionally reflected by mirror 120 and shaped by a first beam-shaping optics unit 130. The concentrating optics 110 unit collects light from the ambient environment and redirects it so that it falls within a narrower cone angle. Concentrating optics unit 110 may be selected from a variety of optical devices such as light guides, aspheric lenses, and Fresnel lenses. However this list is not limited; any optical device which can sufficiently collect and deliver ambient light to the HUD is contemplated for use in the present invention.

The beam-shaping optics unit 130 may comprise a set of conjugated lenses or TIR lenses. The purpose of the beam-shaping optics unit 130 is to collimate the concentrated ambient light before the light is directed towards the light mixing device.

An additional light source 140 is used to emit light to combine with the ambient light collected by the concentrating optics 110. Light source 140 may be a single-color LED, multiple-color LEDs, lasers, an incandescent light bulb, a halogen lamp, an arc lamp, or any other light emitters sufficient to illuminate the liquid crystal element, or any combination of the above light emitters.

The light from light source 140 is then passed into a second beam-shaping optics unit 150. It is possible to adjust the intensity of light from the light source according to the intensity of ambient light being collected when using an optional feedback control system. The purpose of the second beam-shaping optics is to collimate the light from the light source before it is directed towards the light mixing unit 170.

Reflective mirrors 160 are located and oriented such that light from both light source 140 and the collected ambient light are directed towards the light-mixing unit 170. Reflective mirrors 160 may comprise flat mirrors, curved mirrors right-angle prisms or a plurality and/or combination of the above. Reflective mirrors 160 may be formed as a single unit or as two or more separate units. Reflective mirrors can also be replaced by a right-angle prism or other optics, which could alter the direction of the light.

Because it is important for the liquid crystal element to have a uniform incident light supply, light mixing unit 170 is selected from a variety of devices which can mix the light from the light source 140 and the ambient light and output a substantially uniform light beam. Such devices include, but are not limited to an integrating rod or a macrofocal concentrator. Examples of the macrofocal concentrator include a Compound Parabolic Concentrator (CPC), a Compound Ellipsoidal Concentrator (CEC) and a Compound Hyperbolic Concentrator (CHC). However, any optical element which can uniformly mix the two light sources and provide a uniform output is contemplated as the light mixing unit 170 of the present invention. To further enhance homogenization of the ambient light and light from light source 140, the sidewalls of the light mixing unit may diffusively reflect light with the mixer. In the light-mixing unit, the concentrated and collimated ambient light is mixed with the collimated light from light source 140. The function of the light-mixing unit is to combine and homogenize all the light within the light-mixing unit, and to control the spreading angle of the mixed light that will be projected onto the reflective display unit. Consequently, the light that is transmitted out of the light-mixing unit is substantially uniform.

The mixed light that emerges from light-mixing unit 170 is then fed into the condensing unit 180. The condensing unit 180 may comprise a set of conjugated lenses or a set of freeform lenses. Optionally, if a pre-polarizer is present, the condensing unit directs the mixed light towards the pre-polarizer, otherwise, upon exiting condensing unit 180 the mixed light is directed towards the polarizing beamsplitter (PBS) 190.

The pre-polarizer is oriented such that only light in the block polarization state of the PBS is transmitted. Therefore, the transmitted light from the pre-polarizer will be reflected at the PBS towards the reflective display unit 200.

At the PBS 190, light having one specific polarization is completely reflected while light having the orthogonal polarization is transmitted. The polarization may be linear, circular, or cholesteric. Examples of a linear polarizer include a polymeric multiple layer polarizing film or a wire grid polarizer. It will be appreciated that use of a cholesteric polarizer may also necessitate the introduction of a quarter wave retarder in order to convert light between linear and circular polarization. For example, where the reflective display unit operates on linearly polarized light and the light from the light source is also linearly polarized, then the cholesteric polarizer may be provided with a quarter wave retarder layer on its front surface so as to circularize the polarization of the light prior to incidence on the surface of the cholesteric polarizer. Furthermore, the quarter wave retarder linearizes the polarization of the reflected light before propagating to the reflective image display unit. Where the light from the light source is circularly polarized, the reflective image display unit may be provided with a quarter wave retarder at its input so as to linearize the polarization of the light reflected from the cholesteric polarizer. Furthermore, PBS 190 may be flat, or curved in one or two directions.

The light with the block polarization of the PBS will be reflected at PBS 190, and will travel towards the reflective display unit 200. The reflective display unit may be a liquid crystal display (LCD) unit, for example a liquid crystal on silicon (LCoS) display, a digital light processing (DLP) display, or any other suitable display units. When the present invention is in operation, a video signal, which may originate from a GPS unit, a navigation unit, one or more dashboard devices (e.g., speedometer, tachometer, fuel gauge), the onboard computer, or any device that can generate a suitable video signal for the reflective display unit, is fed to reflective display unit 200. The reflective display unit 200 spatially modulates the incident light by polarization rotation. The reflected light contains light in both the block and the pass polarizations for the PBS. Only the light in the pass polarization of the PBS 190, i.e. the image light, is transmitted through the PBS towards the projection unit 210.

As seen in FIG. 1, the projection unit 210 then projects the image light onto diffusing film 220. The diffusing film may be coupled to the projection unit. A real mirror image will be formed by the diffusing film, and the real mirror image will be reflected onto the windshield into the observer's view of sight. It is understood that the use of diffusing film 220 is optional; the reflective display 200 can be configured along with the projecting optics to display a suitable image directly from projection unit 210 onto the windshield.

Figure 4:
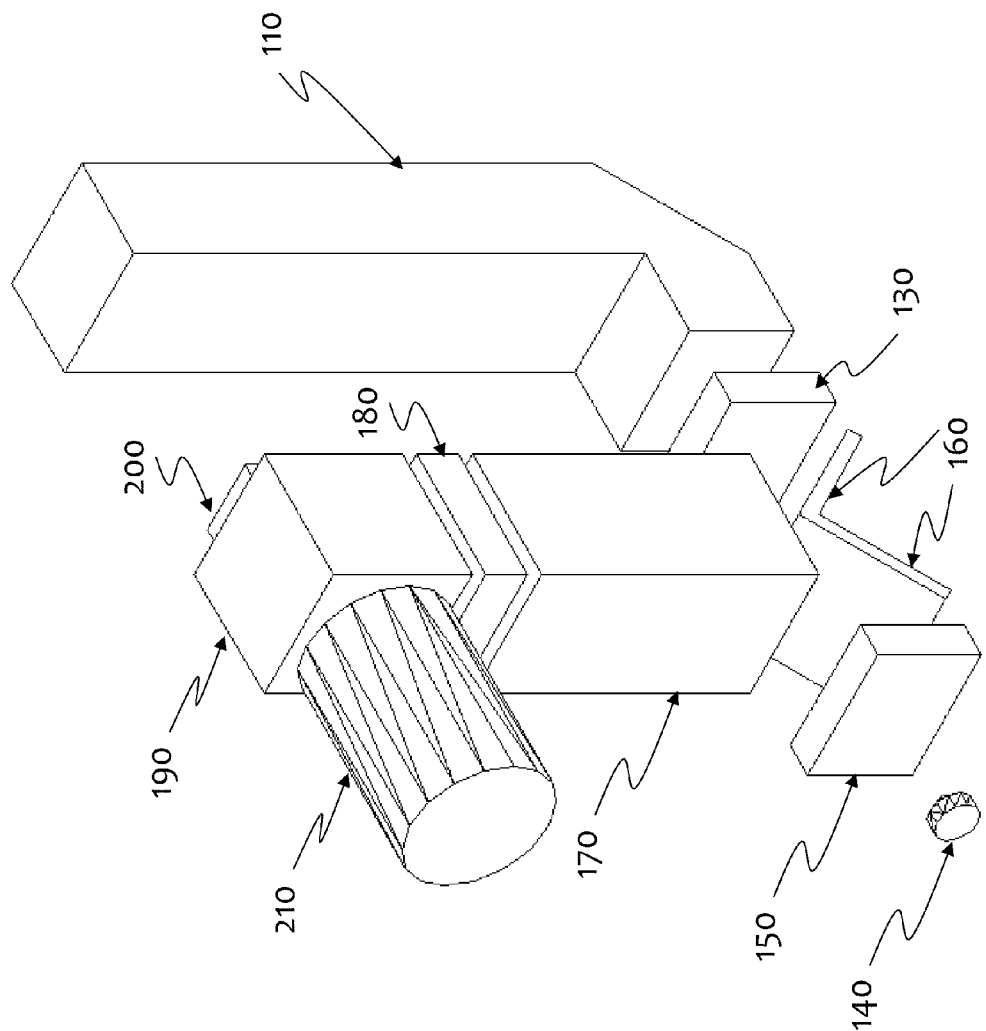
FIG. 4 depicts the interior configuration of the head-up display of FIG. 2.

FIG. 4 depicts the interior arrangement of the optical components of the head-up display 10 of FIG. 2. The elements are substantially similar to those depicted in FIG. 3 as indicated by the corresponding element numbers.

Figure 5:
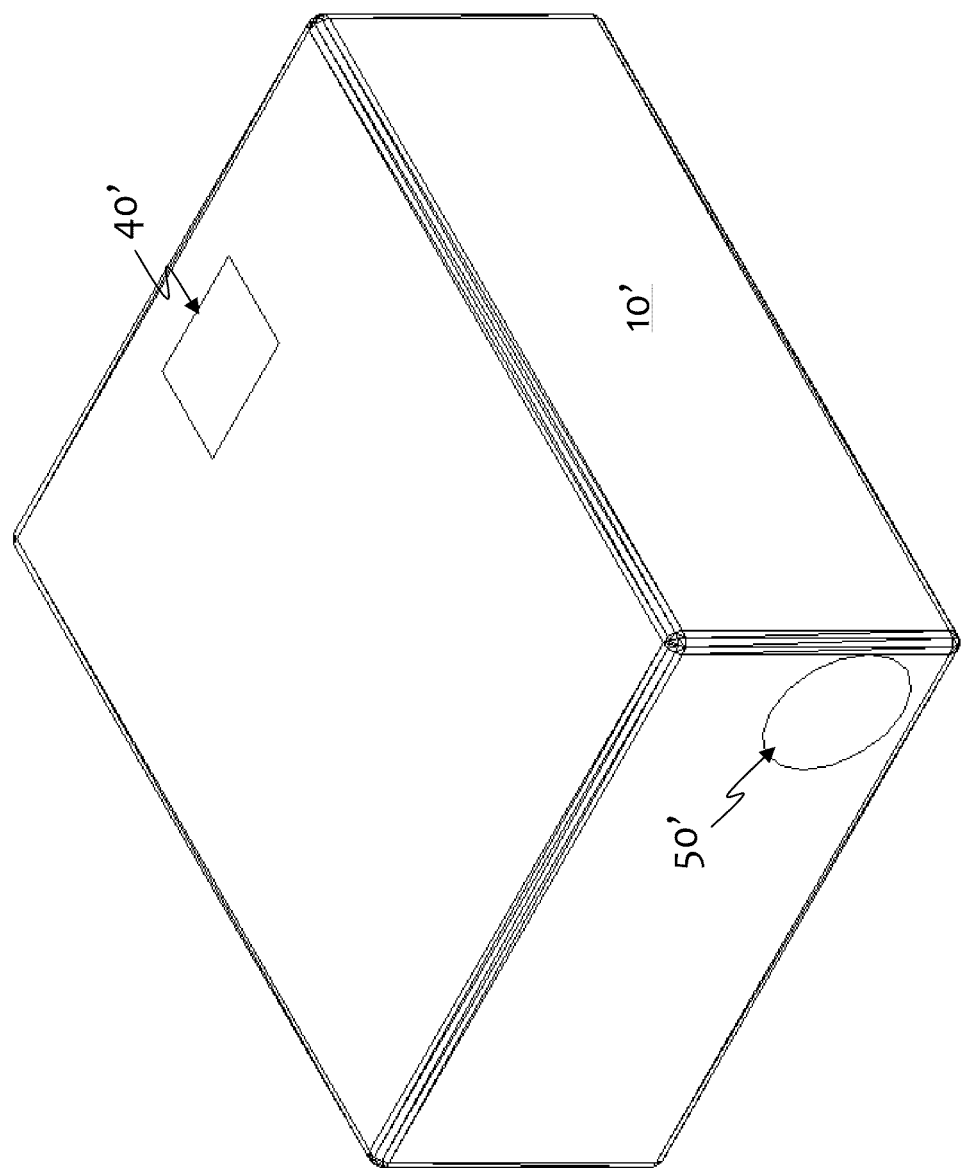
FIG. 5 is an external view of a head-up display incorporating ambient light according to another embodiment of the present invention.
Figure 6:
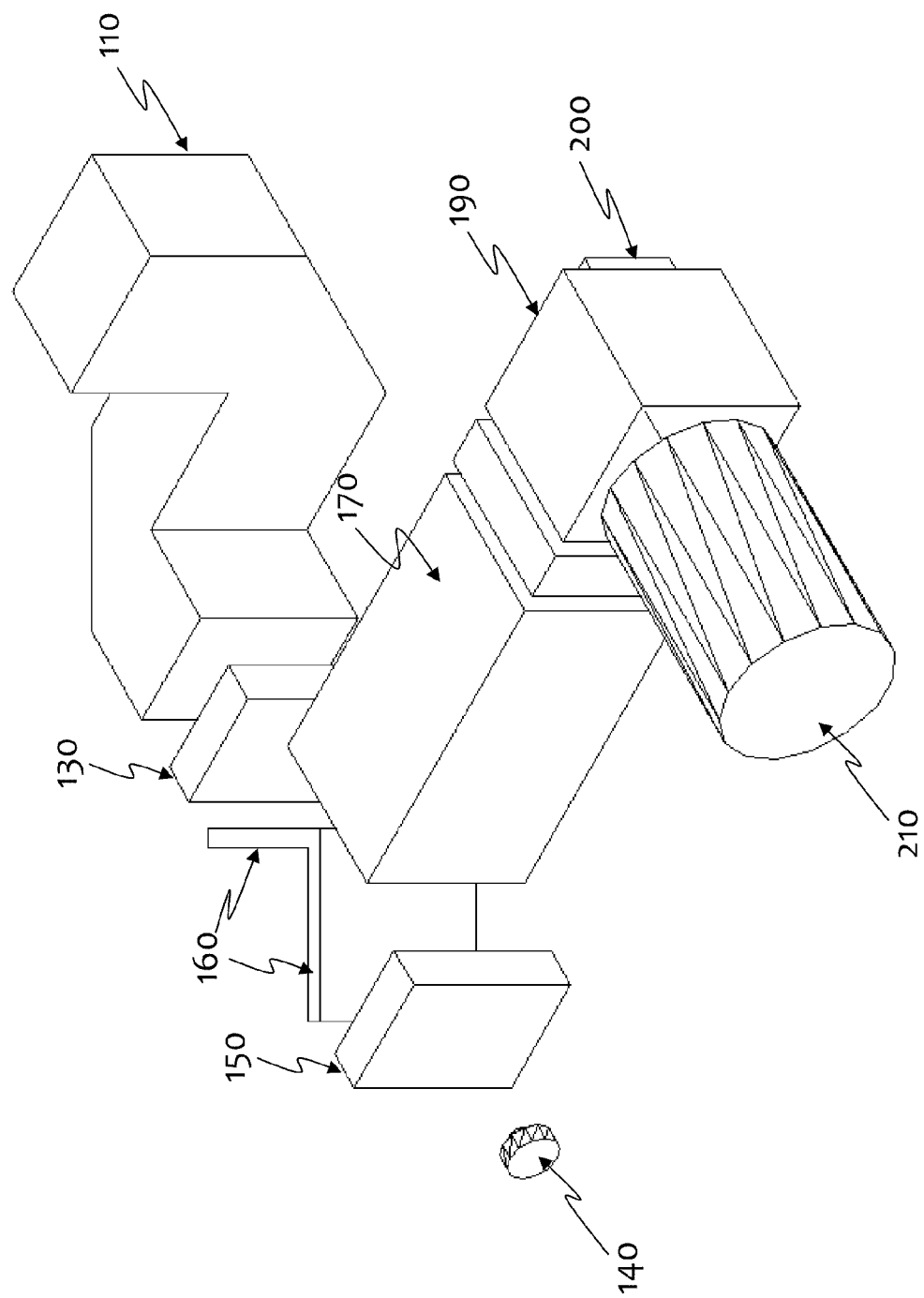
FIG. 6 depicts the interior configuration of the head-up display of FIG. 5.

FIG. 5 depicts the exterior of a low-profile embodiment 10 of the head-up display of the present invention. As in the previous embodiment, ambient light enters window 40 and image light exits from projection port 50. FIG. 6 depicts the optical component arrangement in the interior of head-up display 10. The elements are substantially similar to those depicted in FIG. 3, as indicated by the corresponding element numbers. As seen in FIG. 6, the arrangement of the concentrating optics 110 for the ambient light permit the height of the HUD to be lower than that of the HUD of FIG. 2. This embodiment is particularly useful for after-market installation on a vehicle dashboard as the lower profile provides enhanced visibility.

It should be understood that the exact positions and orientations of the above-mentioned components of the present invention may be adjusted to alter the size, brightness, and sharpness of the image.

Although the present invention has been described in the context of a head-up display (HUD) unit designed primarily for use on a motor vehicle for displaying relevant driving information such as vehicle speed, engine speed (rpm) and global positioning system (GPS) data, it is understood that the present invention also applies to head-up displays in other vehicle contexts, such as aircraft and boats. Further, the present invention can also be applied to other situations that require enhanced illumination, for example as a helmet-mounted display unit or as a pico-projector.

While particular embodiments of the present invention have been illustrated and described, it is understood that the invention is not limited to the precise construction depicted herein and that various modifications, changes, and variations are apparent from the foregoing description. Such modifications, changes, and variations are considered to be a part of the scope of the invention as set forth in the following claims.

What is claimed is:

1. A hybrid illumination system configured to provide a substantially homogenous light source having a controlled spreading angle to a reflective display unit of a head-up display, the system comprising:
    a concentrating optics unit for collecting and redirecting ambient light to form a first light component so that the first light component falls within a cone angle narrower than that of the ambient light;
    an electrically-powered light source for emitting a second light component;
    a light mixing unit for mixing the first light component and the second light component so as to form a substantially homogenous light beam, and further controlling spreading angle of the substantially homogenous light beam such that when the substantially homogenous light beam with controlled spreading angle is used as the light source provided to the reflective display unit of the head-up display, the reflective display unit is operable to generate image light for a video signal by reflecting the substantially homogenous light beam with controlled spreading angle according to the video signal; and
    one or more optical elements for directing the first light component and the second light component towards the light mixing unit such that both light components are substantially incident on the light mixing unit.

2. The hybrid illumination system according to claim 1 further comprising beam shaping optics positioned between the concentrating optics unit and the one or more optical elements for directing the first light component and the second light component towards the light mixing unit.

3. The hybrid illumination system according to claim 1 further comprising beam shaping optics positioned between the electrically-powered light source and the one or more optical elements for directing the first light component and the second light component towards the light mixing unit.

4. The hybrid illumination system according to claim 1 wherein the light mixing unit is an integrating rod or a macrofocal concentrator.

5. The hybrid illumination system according to claim 1 wherein the concentrating optics unit is an optical light guide.

6. The hybrid illumination system according to claim 1 wherein the concentrating optics unit is an aspheric lens.

7. The hybrid illumination system according to claim 1 wherein the concentrating optics unit is a Fresnel lens.

8. The hybrid illumination system according to claim 1 wherein the electrically-powered light source comprises one or more LEDs, or one or more laser diodes.

9. The hybrid illumination system according to claim 1, further comprising a feedback control system for adjusting intensity of the second light component according to intensity of the first light component.

10. The hybrid illumination system according to claim 1, wherein the one or more optical elements comprise reflective mirrors being located and oriented in order to reflect the first light component and the second light component towards the light mixing unit.

11. A head-up display comprising:
    a concentrating optics unit for collecting and redirecting ambient light to form a first light component so that the first light component falls within a cone angle narrower than that of the ambient light;
    an electrically-powered light source for emitting a second light component;
    a light mixing unit for mixing the first light component and the second light component so as to form a light beam that is substantially homogenous, and further controlling spreading angle of the substantially homogenous light beam;
    one or more optical elements for directing the first light component and the second light component towards the light mixing unit such that both light components are substantially incident on the light mixing unit;
    a condensing unit for receiving and condensing the substantially homogenous light beam with controlled spreading angle to form a condensed light, and outputting the condensed light to a polarizing beam splitter;
    a reflective display for receiving light from the polarizing beam splitter and configured to modulate the light from the polarizing beam splitter with information from a source of electrical information signals to form a modulated light, the reflective display being further configured to reflect the modulated light back towards the polarizing beam splitter; and
    a projection unit for projecting the modulated light to create an image on a windshield.

12. The head-up display according to claim 11 further comprising a diffusing film for receiving the modulated light from the projection unit and reflecting the modulated light onto the windshield.

13. The head-up display according to claim 11 wherein the reflective display is a liquid crystal on silicon (LCoS) display or a digital light processing (DLP) display.

14. The head-up display according to claim 11 further comprising beam shaping optics positioned between the concentrating optics unit and the one or more optical elements for directing the first light component and the second light component towards the light mixing unit.

15. The head-up display according to claim 11 further comprising beam shaping optics positioned between the electrically-powered light source and the one or more optical elements for directing the first light component and the second light component towards the light mixing unit.

16. The head-up display according to claim 11 wherein the electrically-powered light source comprises one or more LEDs, or one or more laser diodes.

17. The head-up display according to claim 11 wherein the concentrating optics unit is an optical light guide, an aspheric lens or a Fresnel lens.

18. The head-up display according to claim 11 wherein the light mixing unit is an integrating rod or a macrofocal concentrator.

19. A motor vehicle navigation system including the head-up display according to claim 11.

20. A motor vehicle navigation system including the head-up display according to claim 11 wherein the navigation system includes GPS.

* * * * *